US011788512B2

(12) United States Patent
Sardellano (10) Patent No.: US 11,788,512 B2
(45) Date of Patent: Oct. 17, 2023

(54) APPARATUS FOR MOVEMENT ALONG A TOWER STRUCTURE

(71) Applicant: Vestas Wind Systems A/S, Aarhus (DK)

(72) Inventor: Angelo Sardellano, Crispiano (IT)

(73) Assignee: Vestas Wind Systems A/S, Aarhus (DK)

( * ) Notice: Subject to any disclaimer, the term of this patent is extended or adjusted under 35 U.S.C. 154(b) by 1137 days.

(21) Appl. No.: 16/330,419

(22) PCT Filed: Sep. 14, 2017

(86) PCT No.: PCT/DK2017/050289
§ 371 (c)(1),
(2) Date: Mar. 5, 2019

(87) PCT Pub. No.: WO2018/050190
PCT Pub. Date: Mar. 22, 2018

(65) Prior Publication Data
US 2020/0340455 A1    Oct. 29, 2020

(30) Foreign Application Priority Data

Sep. 14, 2016 (DK) .......................... PA 2016 70700

(51) Int. Cl.
*F03D 80/55* (2016.01)
*B05B 13/04* (2006.01)
(Continued)

(52) U.S. Cl.
CPC .......... *F03D 80/55* (2016.05); *B05B 13/0436* (2013.01); *E04G 3/32* (2013.01);
(Continued)

(58) Field of Classification Search
CPC ....... F03D 80/50; F03D 80/55; F16M 13/022; F05B 2230/286; B05B 13/0436;
(Continued)

(56) References Cited

U.S. PATENT DOCUMENTS

| 1,222,200 A | * | 4/1917 | Grandinetti | ............. | B66F 11/04 52/109 |
| 3,252,199 A | * | 5/1966 | Bossner | .................. | E04G 11/28 425/DIG. 126 |

(Continued)

FOREIGN PATENT DOCUMENTS

| CN | 2645519 Y | 10/2004 |
| CN | 2663594 Y | 12/2004 |

(Continued)

OTHER PUBLICATIONS

China National Intellectual Property Administration, First Notification of Office Action in CN Application No. 201780062580.9, dated Dec. 12, 2019.
(Continued)

*Primary Examiner* — Daniel P Cahn
*Assistant Examiner* — Shiref M Mekhaeil
(74) *Attorney, Agent, or Firm* — Wood Herron & Evans LLP (57) ABSTRACT

A plurality of sliding rails and a frame structure comprising a plurality of frame elements configured to be arranged at least partly circumferentially around a tower structure. Each frame element is slidably connected to at least one of the sliding rails, and the frame elements and the sliding rails are interconnected to form a scissor structure. An upwardly directed lifting force applied by a hoisting mechanism at connecting points at or near positions where the frame elements are connected to the sliding rails, in combination with gravity working on the frame structure, causes the
(Continued)

frame elements to slide along the sliding rails, thereby causing the scissor structure to contract or expand to adjust a diameter of the frame structure to an outer diameter of the tower structure having the apparatus mounted thereon.

14 Claims, 7 Drawing Sheets

(51) Int. Cl.
*E04G 3/32* (2006.01)
*F16M 13/02* (2006.01)
*E04G 3/28* (2006.01)
*F03D 80/50* (2016.01)
*E04G 3/24* (2006.01)
*B65D 61/00* (2006.01)

(52) U.S. Cl.
CPC .......... *F16M 13/022* (2013.01); *B65D 61/00* (2013.01); *E04G 3/243* (2013.01); *E04G 2003/286* (2013.01); *F03D 80/50* (2016.05); *F05B 2230/61* (2013.01); *Y02E 10/72* (2013.01); *Y10S 180/901* (2013.01)

(58) Field of Classification Search
CPC ...... B05D 2254/02; B65D 61/00; B65D 1/48; B65D 1/60; B24C 3/062; Y02E 10/72; Y10S 180/901; Y10S 187/90; E02B 17/0026; E02B 17/08; E04G 3/32; E04G 3/243; E04G 2003/286; E06C 7/16; E06B 9/0661
See application file for complete search history.

(56) References Cited

U.S. PATENT DOCUMENTS

| | | | | | |
|---|---|---|---|---|---|
| 3,516,129 | A | * | 6/1970 | Yoder | ........... E04G 11/22 425/150 |
| 3,659,978 | A | * | 5/1972 | Svensson | ........ E04G 11/22 425/162 |
| 3,659,982 | A | * | 5/1972 | Svensson | ........ E04G 11/20 249/20 |
| 3,710,806 | A | * | 1/1973 | Kelly | ............ E04B 1/3441 52/645 |
| 4,013,114 | A | * | 3/1977 | Goebel | .......... E04G 11/065 52/109 |
| 4,076,175 | A | * | 2/1978 | Bert | ........... B05B 13/0214 239/588 |
| 4,081,227 | A | * | 3/1978 | Bohmer | .......... E04G 11/22 249/20 |
| 4,527,941 | A | * | 7/1985 | Archer | ............ B60R 3/02 296/61 |
| 4,607,656 | A | * | 8/1986 | Carter | ........... E04H 15/50 52/109 |
| 4,770,089 | A | * | 9/1988 | Vinicombe | ........ B05B 16/40 118/326 |
| 5,038,532 | A | * | 8/1991 | Shahinpoor | ....... E04B 1/3441 52/109 |
| 5,701,923 | A | * | 12/1997 | Losi, Jr. | ............ E04H 15/50 135/145 |
| 6,230,729 | B1 | * | 5/2001 | Carter | .......... E04H 15/58 135/145 |
| 7,240,686 | B2 | * | 7/2007 | Seo | ............ E04H 15/50 135/159 |
| 7,798,162 | B2 | * | 9/2010 | Sy-Facunda | ........ E04H 15/50 135/145 |
| 8,544,484 | B2 | * | 10/2013 | Jensen | ........... F03D 80/50 134/198 |
| 10,267,031 | B2 | * | 4/2019 | Matsuoka | .......... A63H 33/00 |
| 10,690,120 | B2 | * | 6/2020 | Fraughton | ........... B08B 1/008 |
| 11,426,770 | B2 | * | 8/2022 | Bentley | ........... B08B 1/005 |
| 2003/0172966 | A1 | * | 9/2003 | Dotterweich | .......... E04H 15/50 135/131 |
| 2008/0128011 | A1 | * | 6/2008 | Carter | ........... E04H 15/50 135/122 |
| 2008/0184502 | A1 | * | 8/2008 | Roberts | ............ A61G 3/061 14/71.1 |
| 2010/0018551 | A1 | * | 1/2010 | Gallegos | .......... F03D 80/50 15/21.1 |
| 2010/0130108 | A1 | * | 5/2010 | Mann | ........... E04G 3/30 451/75 |
| 2010/0132738 | A1 | * | 6/2010 | Kumar | .......... B08B 3/022 134/10 |
| 2011/0088723 | A1 | * | 4/2011 | Jensen | ........... F03D 80/50 134/172 |
| 2012/0258252 | A1 | * | 10/2012 | Jensen | ............ B66D 3/18 118/305 |
| 2013/0122210 | A1 | * | 5/2013 | Jensen | ........... F03D 80/55 427/427.1 |
| 2013/0122211 | A1 | * | 5/2013 | Jensen | ......... B05B 13/0436 239/289 |
| 2013/0228397 | A1 | * | 9/2013 | Horn | ............ E04G 3/28 414/800 |
| 2018/0087490 | A1 | * | 3/2018 | Fraughton | .......... F03D 80/55 |
| 2018/0154954 | A1 | * | 6/2018 | Bagheri | ........... B62D 55/14 |
| 2019/0085828 | A1 | * | 3/2019 | Jamund | ........... F03D 80/55 |
| 2021/0348598 | A1 | * | 11/2021 | Bentley | ........... F03D 80/55 |

FOREIGN PATENT DOCUMENTS

| | | | |
|---|---|---|---|
| CN | 103590985 A | 2/2014 | |
| CN | 103608129 A | 2/2014 | |
| DE | 465292 C | 9/1928 | |
| DE | 202013105758 U1 * | 3/2014 | ............ E04G 3/30 |
| ES | 2394824 A1 | 2/2013 | |
| JP | 2004176403 A | 6/2004 | |
| WO | 2017032438 A1 | 3/2017 | |
| WO | WO-2017032438 A1 * | 3/2017 | .......... B62D 55/065 |

OTHER PUBLICATIONS

European Patent Office, International Search Report and Written Opinion in PCT Application No. PCT/DK2017/050289, dated Jan. 8, 2018.

Danish Patent and Trademark Office, Search and Exam Report in PA 2016 70700, dated Mar. 3, 2017.

* cited by examiner

APPARATUS FOR MOVEMENT ALONG A TOWER STRUCTURE

FIELD OF THE INVENTION

The present invention relates to an apparatus for movement along a tower structure, such as a wind turbine tower. The apparatus of the invention may, e.g., be used for cleaning the tower structure, for providing surface treatment to the tower structure, e.g. in the form of paint, coating, abrasive treatment or the like, and/or for carrying personnel during inspection or maintenance of the tower structure. The apparatus of the invention is capable of automatically adapting an inner diameter to an outer diameter of the tower structure.

BACKGROUND OF THE INVENTION

It is sometimes necessary to gain access to an outer surface of a tower structure, such as a wind turbine tower. This may, e.g., be in order to clean the tower structure or in order to provide surface treatment to the tower structure, e.g. in the form of paint, coating, abrasive treatment or the like. Alternatively or additionally, personnel may need to gain direct access to the surface of the tower structure, e.g. in order to inspect the tower structure and/or to perform maintenance on the tower structure.

Previously, such access to tower structures has been provided by means of freestanding cranes or other kinds of lifts, or by personnel being suspended from an upper part of the tower structure, using ropes, wires or the like. Access to the site of a tower structure does not always allow for heavy cranes or lifts being provided, and suspending personnel from the tower structure may potentially be hazardous to the personnel.

In order to provide simple and safe access to tower structures, apparatuses for movement along the tower structure have been provided. For instance, US 2011/0088723 A1 discloses a wind turbine fluid application apparatus. The apparatus includes a frame which circumferentially extends at least partially around a wind turbine tower. The frame can include a frame expansion member and a restraining device which enable an expansion and contraction of a circumference of the frame. The expansion member and the restraining device may, e.g., be in the form of a pivoting expansion member and an elastomeric or spring member, or in the form of a spring loaded expansion member. Thus, the mechanism which allows the apparatus to adapt to a varying diameter of the tower structure is a separate mechanism.

DESCRIPTION OF THE INVENTION

It is an object of embodiments of the invention to provide an apparatus for movement along a tower structure, in which an inner diameter of the apparatus can automatically be adapted to a varying diameter of the tower structure as a consequence of the movement of the apparatus.

It is a further object of embodiments of the invention to provide an apparatus for movement along a tower structure, in which an inner diameter of the apparatus can automatically be adapted to a varying diameter of the tower structure without requiring a separate mechanism.

It is an even further object of embodiments of the invention to provide a system for movement along a tower structure, in which an inner diameter of an apparatus of the system can automatically be adapted to a varying diameter of the tower structure as a consequence of the movement of the apparatus, and without requiring a separate mechanism.

According to a first aspect the invention provides an apparatus for movement along a tower structure, the apparatus being configured to be arranged at least partly circumferentially around the tower structure, the apparatus comprising:
  a plurality of sliding rails,
  a frame structure comprising a plurality of frame elements, each frame element being slidably connected to at least one of the sliding rails, the frame elements and the sliding rails being interconnected to form a scissor structure,
wherein the frame structure is connectable to a hoisting mechanism via connecting points of at least some of the frame elements at or near positions where the frame elements are connected to the sliding rails, and wherein an upwardly directed lifting force applied at the connecting points, in combination with gravity working on the frame structure, causes the frame elements to slide along the sliding rails, thereby causing the scissor structure to contract or expand to adjust a diameter of the frame structure to an outer diameter of a tower structure having the apparatus mounted thereon.

According to the first aspect the invention provides an apparatus for movement along a tower structure. In the present context the term 'tower structure' should be interpreted to mean a structural construction having an elongated shape, which defines a longitudinal axis, and which is capable of carrying other components. The tower structure could, e.g., be a wind turbine tower, carrying a wind turbine nacelle.

The apparatus is movable along the tower structure, i.e. it is movable along the longitudinal axis defined by the tower structure. Furthermore, the apparatus is configured to be arranged at least partly circumferentially around the tower structure. This should be interpreted to mean that the apparatus is arranged at a given position along the longitudinal axis defined by the tower structure, along the periphery of the tower structure and in such a manner that it covers at least a part of the periphery of the tower structure at this position. The apparatus may be arranged completely around the tower structure, in which case it covers the entire periphery of the tower structure. As an alternative, only part of the periphery of the tower structure may be covered by the apparatus.

Accordingly, in an embodiment according to the invention, the apparatus is being configured to be arranged circumferentially around the tower structure.

The apparatus comprises a plurality of sliding rails and a frame structure. The frame structure comprises a plurality of frame elements, each frame element being slidably connected to at least one of the sliding rails. Accordingly, each of the frame elements is capable of performing sliding movements relative to and along at least one of the sliding rails. In other words, the frame elements and the sliding rails are connected in such a manner that the connecting point between a given frame element and a given sliding rail can be displaced along the sliding rail.

The frame elements and the sliding rails are further interconnected to form a scissor structure. In the present context the term 'scissor structure' should be interpreted to mean a structure comprising a number of elements being pivotally connected to each other, thereby allowing the elements to perform movements relative to each other similar to the movements performed by a pair of scissors when in use.

The frame structure is connectable to a hoisting mechanism via connecting points of at least some of the frame elements. The connecting points are arranged at positions at or near positions where the frame elements are connected to the sliding rails. The hoisting mechanism is used for hoisting or lowering the apparatus along the tower structure, and it may, e.g., be or comprise a crane, a winch or the like.

When a hoisting mechanism connected to the frame structure at the connecting points is operated in order to hoist or lift the apparatus, and upwardly directed lifting force will be applied to the frame structure at the connecting points. Simultaneously, gravity will cause a downwardly directed force to be applied to the frame structure. The combination of the upwardly directed lifting force and the downwardly directed force caused by gravity causes the frame elements to slide along the sliding rails. This causes the scissor structure to contract or expand, and thereby the diameter of the frame structure adjusts to match an outer diameter of the tower structure.

Accordingly, in the case that the tower structure has a diameter which varies along the length of the tower structure, the inner diameter of the frame structure will automatically adjust to match the outer diameter of the tower structure, as the apparatus is moved along the tower structure. This is obtained as a direct consequence of a hoisting mechanism applying an upwardly directed force to the frame structure, and due to the scissor structure defined by the frame elements and the sliding rails. Thus, this is obtained without requiring any separate mechanisms.

The frame elements may be arranged in pairs, where a first frame element of a pair of frame elements has one end fixedly connected to a first sliding rail and another, opposite end connected slidingly to a second sliding rail, and where a second frame element of the pair of frame elements has one end fixedly connected to the second sliding rail and another, opposite end connected slidingly to the first sliding rail, and the first frame element and the second frame element may be pivotally connected to each other at a position arranged between the ends of the frame elements.

According to this embodiment, a given pair of frame elements interconnects two sliding rails. Each frame element is connected to the two sliding rails via its ends, and the frame elements cross each other and are pivotally connected to each other at the position where they cross. One end of each frame element is allowed to slide along the sliding rail which it is connected to, while the other end is fixedly connected to the other sliding rail. When an upwardly directed lifting force is applied to the frame elements at or near the positions where the frame elements are slidingly connected to the sliding rails, these ends of the frame elements will be caused to slide along the respective sliding rails. However, the opposite ends of the frame elements, which are fixedly connected to the respective sliding rails, will remain in position relative to the sliding rails. Thereby the sliding movements of one end of each frame element will cause a distance between a fixed connection of one frame element and a sliding connection of another frame element, along a given sliding rail, to be altered, and the two frame elements will perform a pivoting movement relative to each other about the pivot point defined at the point where the frame structures cross. As a consequence, a distance between neighbouring sliding rails is also altered, thereby causing the scissor structure to contract or expand and adjusting an inner diameter of the frame structure to an outer diameter of the tower structure.

The frame structure may define a polygonal shape configured to surround the circumference of a tower structure.

According to this embodiment, the frame structure defines substantially straight sides interconnected to form a polygonal shape, preferably a regular polygonal shape. The sliding rails may advantageously be arranged in the corners of the polygonal shape, while the sides of the polygonal shape may be formed by frame elements. This allows the frame structure to be formed from substantially straight or beam like frame element, while allowing the frame structure to approximately follow a circular cross sectional shape of a tower structure having the apparatus mounted thereon. The polygonal shape may advantageously be an octagonal shape, since an octagonal shape provides a good approximation to a circular shape, while maintaining the number of sides at a minimum, thereby providing a simple structure. However, other polygonal shapes having fewer or more sides could also be applied.

The apparatus may comprise treatment means for applying a surface treatment to a surface of a tower structure, and the treatment means may be configured for cleaning, abrasive treatment, painting and/or coating of the surface of the tower structure.

According to this embodiment, the apparatus can be used for applying a relevant surface treatment to a surface of the tower structure. For instance, the apparatus may be a cleaning apparatus which can be used for cleaning the surface of the tower structure. In this case the treatment means may be configured to apply water and/or a cleaning agent to the tower surface. Alternatively or additionally, the treatment means may include brushes or the like for scrubbing the tower surface.

As an alternative, the apparatus may be used for painting or coating the surface of the tower structure. In this case the treatment means may be configured to apply a relevant kind of paint or coating to the surface of the tower structure and/or for distributing such paint or coating in a desired manner across the surface of the tower structure.

As another alternative, the apparatus may be used for applying abrasive treatment to the surface of the tower structure, e.g. in order to remove a previously applied coat of paint or coating. In this case the treatment means may be configured to perform such abrasive treatment. For instance, the treatment means may include grinding tools, scrapers or the like.

Alternatively or additionally, the apparatus may be provided with a platform or the like for accommodating personnel. In this case a person positioned on the platform is moved along with the apparatus along the tower structure, and may therefore gain access to the surface of the tower structure, e.g. in order to inspect the tower structure and/or in order to perform maintenance on the tower structure.

The treatment means may comprise a plurality of nozzles arranged to spray a fluid onto a tower structure having the apparatus mounted thereon, and at least one fluid supply connected to the nozzles. The fluid may, e.g., be water, a cleaning agent, paint, coating or other substances for performing relevant surface treatment. When such fluid is applied to the tower structure via a plurality of nozzles, it is ensured that the fluid is directed towards the surface. Furthermore, an even distribution of the fluid on the surface is ensured. The fluid supply could, e.g., be a reservoir or a tank. Alternatively, the fluid supply could be a tap water supply.

The treatment means may comprise a plurality of spray confinement means arranged in pairs on opposing sides of at least some of the nozzles in order to substantially contain the fluid being sprayed from the nozzles within a boundary defined by the spray confinement means. According to this embodiment, the spray confinement means ensure that the fluid being sprayed by means of the nozzles is directed towards a desired part of the surface of the tower structure. This reduces fluid waste and minimises the risk of fluid being spilled to the surrounding environment, thereby reducing the risk of undesired pollution.

The spray confinement means may, e.g., be or comprise spray protection brushes.

The apparatus may comprise or be connected to a fluid collecting system for collecting surplus fluid sprayed by means of the nozzles. According to this embodiment, the risk of fluid being spilled to the surrounding environment is even further reduced. The fluid collecting system may, e.g., comprise a tank, a reservoir, a collecting bag, a drain or any other suitable means for accommodating the surplus fluid being collected by means of the fluid collecting system. The fluid collecting system may further comprise a system of hoses, pipes or the like interconnecting a region where the nozzles are arranged and a reservoir, tank or the like, in order to guide the surplus fluid to the reservoir or tank.

The frame structure may comprise two or more subassemblies being releasably connected to each other, thereby allowing the frame structure to be assembled and disassembled. According to this embodiment, the frame structure has a modular design, in the sense that it is assembled from a plurality of modules in the form of subassemblies. This makes it easier to transport the apparatus to or from a site where the tower structure is positioned.

Preferably, each subassembly may have a size and a weight which allows it to be handled by a single person, e.g. a weight which does not exceed 20 kg. In this case one person is able to assemble and operate the apparatus once it has been delivered at the site of the tower structure. This saves man hours while it is ensured that the personnel are not subjected to undue burdens.

Furthermore, the modular design of the frame structure described above allows the apparatus to be assembled on site around the circumference of a lower part of the tower structure, i.e. the apparatus may cover the entire circumference of the tower structure. The apparatus may then be operated to move along the tower structure while the desired surface treatment, inspection, maintenance, etc. is performed. Finally, the apparatus can be disassembled and transported away from the site.

The releasable connections used for connecting the subassemblies to each other may be in the form of quick release fasteners allowing the subassemblies to be easily and quickly assembled and disassembled. Examples of quick release fasteners are detent pins and linchpins. Alternatively or additionally, the connections may be in the form of snap connections, screws, bolts, etc.

According to a second aspect the invention provides a system for movement along a tower structure, the system comprising:

an apparatus according to the first aspect of the invention, and a hoisting mechanism connected to the frame structure of the apparatus for hoisting the apparatus along a tower structure having the apparatus mounted thereon.

It should be noted that a person skilled in the art would readily recognise that any feature described in combination with the first aspect of the invention could also be combined with the second aspect of the invention, and vice versa. The remarks set forth above are therefore equally applicable here.

Thus, the system according to the second aspect of the invention comprises an apparatus according to the first aspect of the invention and a hoisting mechanism. The hoisting mechanism is connected to the frame structure of the apparatus at the connecting points arranged at or near the positions where the frame elements are slidingly connected to the sliding rails. Accordingly, the hoisting mechanism is capable of providing the upwardly directed lifting force which causes the scissor structure to contract or expand as described above.

The hoisting mechanism may comprise a beam configured to be arranged on top of a tower structure, a lifting apparatus and one or more wires interconnecting the lifting apparatus and the connecting points of the frame elements of the apparatus, via the beam. According to this embodiment, the lifting force is applied to the apparatus via a point arranged on top of the tower structure, and thereby it is ensured that the lifting force always has a significant upwardly directed component, regardless of the position of the apparatus along the tower structure.

The lifting apparatus could, e.g., be or comprise one or more cranes, e.g., arranged on top of the tower structure. Alternatively or additionally, the lifting apparatus could be or comprise one or more winches. The winches could also be arranged on top of the tower structure. However, the winches could alternatively be arranged in another position, e.g. on the ground, and be connected to one or more pulleys arranged at the beam on top of the tower structure, via a wire, a rope or the like.

The hoisting mechanism may comprise a control mechanism arranged to ensure that the apparatus maintains a substantially horizontal orientation during movement along a tower structure.

In some cases the hoisting mechanism may comprise at least two cranes or at least two winches. In this case there is a risk that the cranes or winches are operated at speeds which differ from each other and/or apply lifting forces which differ from each other to the apparatus. This leads to the apparatus becoming increasingly inclined with respect to a horizontal orientation. This is undesirable, in particular if the apparatus comprises a platform for personnel.

In order to ensure that the apparatus remains in a substantially horizontal orientation, the control mechanism may coordinate operation of the two or more cranes or winches, e.g. in order to ensure that they are operated at substantially identical speeds, or in order to compensate for any differences in operating speed. This may, e.g., be obtained in the following manner.

The control mechanism may be provided with a pendulum which detects when the apparatus is diverging from a horizontal orientation. The pendulum may be directly connected to the control of the cranes or winches in such a manner that it automatically ensures that the speeds of the cranes or winches are synchronized by increasing or reducing the speed of one or both cranes or winches appropriately to restore the horizontal orientation of the apparatus.

The hoisting mechanism may comprise a fall arrest system for preventing free fall of the apparatus in the case of an emergency. The emergency could, e.g., be in the form mechanical errors or malfunction of the equipment, such as rupture of one or more chains. When such emergency situations occur, it is important that the apparatus does not simply fall to the ground, since this would be hazardous to personnel on the ground as well as to any personnel being carried by the apparatus. The fall arrest system may, e.g., include one or more safety ropes or wires arranged to carry the apparatus in the case of an emergency. One or more sliders may be arranged to slide along ropes. The fall arrest system may further comprise mechanical means which allows the apparatus to climb down the tower structure in the absence of electrical power.

The system may further comprise a remote control, and the remote control may be configured for wired or wireless control of at least the hoisting mechanism from a position remote to the hoisting mechanism. According to this embodiment, at least the hoisting mechanism can be operator by an operator from the remote position, i.e. without the operator being present at the apparatus and/or at the hoisting mechanism. For instance, the operator may be positioned on the ground, while operating the hoisting mechanism to cause the apparatus to move along the tower structure.

Furthermore, the apparatus may be controlled via the remote control, or via a similar separate remote control. In this case, the operator may control the apparatus as such, e.g. causing the apparatus to apply a desired kind of surface treatment to the surface of the tower structure, from a remote position, in addition to controlling the movement of the apparatus via control of the hoisting mechanism.

The apparatus may comprise a plurality of nozzles arranged to spray a fluid onto a tower structure having the apparatus mounted thereon, and the system may further comprise a fluid supply connected to the nozzles and a fluid collecting system for collecting surplus fluid sprayed by means of the nozzles. As described above, the fluid being sprayed by means of the nozzles may be an appropriate fluid for use in a desired surface treatment for the tower structure, such as water, a cleaning agent, paint, coating, etc. The fluid collecting system ensures that the fluid being sprayed by means of the nozzles is applied to the surface of the tower structure having the apparatus mounted thereon, but spilling of surplus fluid to the surrounding environment is minimised.

The fluid collecting system may comprise a reservoir configured to be arranged circumferentially around a tower structure. The reservoir is arranged to accommodate the surplus fluid being collected by the fluid collecting system. According to this embodiment, it is ensured that, regardless of the position of the nozzles along the circumference of the tower structure, the surplus fluid is collected in the reservoir.

The reservoir may be provided with flexible walls, allowing it to adapt its shape as fluid is collected in the reservoir. This will also allow the reservoir to be easily handled, for instance when the system is mounted on a tower structure.

The reservoir may comprise a seal, and the seal may be configured to conform to a surface of the tower structure. According to this embodiment, a sealing between the reservoir and the tower structure is provided, thereby ensuring that surplus fluid is not allowed to pass between the tower structure and the reservoir. This even further reduces the risk of spilling surplus fluid to the surrounding environment.

Since the seal is configured to conform to a surface of the tower structure, this efficient sealing is obtained regardless of the size and shape of the tower structure. A part of the reservoir may be inflatable, and it may be caused to conform to the surface of the tower structure when the inflatable part is inflated. Alternatively, the reservoir may be fitted against the tower structure by means of a strap or the like, such as by means of a ratchet strip.

Alternatively or additionally, another part of the reservoir which is arranged away from the tower structure may be inflatable, thereby forming a leak barrier when inflated. This prevents collected surplus fluid from leaking from the reservoir.

The reservoir may be arranged circumferentially about a base of the tower structure, and then free ends of the reservoir may be joined together in order to close the reservoir. Thereby the reservoir extends along the entire periphery of the tower structure. The free ends may, e.g., be joined by means of Velcro® closures or the like.

BRIEF DESCRIPTION OF THE DRAWINGS

The invention will now be described in further detail with reference to the accompanying drawings in which.

DETAILED DESCRIPTION OF THE DRAWINGS

Figure 1:
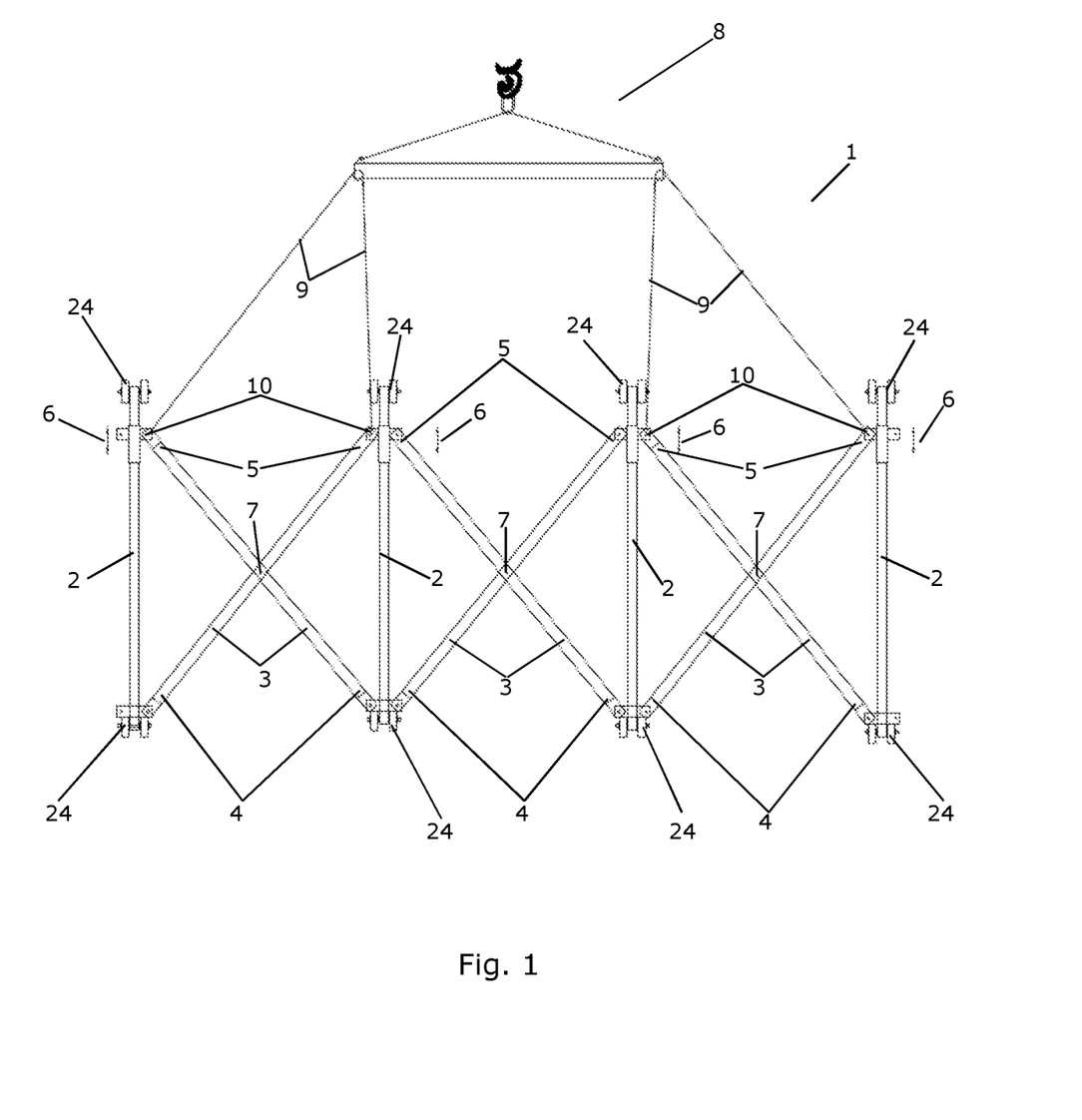
FIG. 1 is a side view of an apparatus according to an embodiment of the invention.

FIG. 1 is a side view of an apparatus 1 according to an embodiment of the invention. The apparatus 1 comprises a plurality of sliding rails 2, four of which are shown. The apparatus 1 further comprises a frame structure comprising a plurality of frame elements 3, six of which are shown. The apparatus 1 may be arranged at least partly circumferentially around a tower structure. This will be described in further detail below with reference to FIGS. 2-5 and 8*a*-8*h*.

Each of the frame elements 3 has one end 4 fixedly connected to one of the sliding rails 2 and another, opposite end 5 connected slidingly to another one of the sliding rails 2. Accordingly, the ends 5 of the frame elements 3 are allowed to slide along the sliding rails 2, as indicated by arrows 6, while the ends 4 of the frame elements 3 remain in the illustrated position relative to the sliding rails 2. Furthermore, the frame elements 3 are arranged in pairs, the two frame elements 3 forming a pair being connected to the same two sliding rails 2. The frame elements 3 of a pair of frame elements 3 are further pivotally connected to each other at a pivot point 7. Accordingly, the frame elements 3 of a pair of frame elements 3 are further allowed to pivot relative to each other, about the pivot point 7. The frame elements 3 and the sliding rails 2 in combination form a scissor structure. This will be described in further detail below.

The frame structure is connected to a hoisting mechanism 8, via wires 9, at connecting positions 10 being arranged near the positions where the frame elements 3 are slidingly connected to the sliding rails 2.

The apparatus 1 may be operated in the following manner. When it is desired to hoist the apparatus 1 along a tower structure, i.e. to move it to a higher position along the tower structure, the hoisting mechanism 8 applies an upwardly directed lifting force to the connecting points 10. Simultaneously, gravity working on the frame structure will tend to pull the frame structure in a downwards direction. This will cause the ends 5 of the frame elements 3 to slide along the sliding rails 2 in an upwards direction, causing the frame elements 3 of each pair of frame elements 3 to pivot relative to each other. As a consequence, the scissor structure formed by the frame elements 3 and the sliding rails 2 will contract until a diameter of the frame structure matches an outer diameter of the tower structure which the apparatus 1 is moved along. In the case that the diameter of the tower structure decreases along an upwards direction, the diameter of the frame structure is thereby automatically decreased to match the outer diameter of the tower structure, as the apparatus 1 is moved upwards along the tower structure.

Similarly, in the case that it is desired to lower the apparatus 1 along the tower structure, i.e. to move the apparatus to a lower position along the tower structure, the hoisting mechanism 8 will still apply an upwardly directed force to the connecting points 10 of the frame structure, while gravity working on the frame structure pulls the frame structure in a downwards direction. Accordingly, the scissor structure formed by the frame elements 3 and the sliding rails 2 is also biased towards a decreased diameter, and the diameter of the frame structure therefore also automatically matches the outer diameter of the tower structure in this case. Accordingly, the diameter of the frame structure automatically increases to match the increasing outer diameter of the tower structure, as the apparatus 1 is lowered along the tower structure.

In the embodiment shown the apparatus 1 is equipped with rollers 24 that roll on the surface of the tower, as the apparatus 1 moves along the tower. The rollers 24 maintain a fixed distance between the surface of the tower and the apparatus 1. The rollers 24 apply a substantially constant force to the surface of the tower. The force depends on the weight of the apparatus 1.

Figure 2:
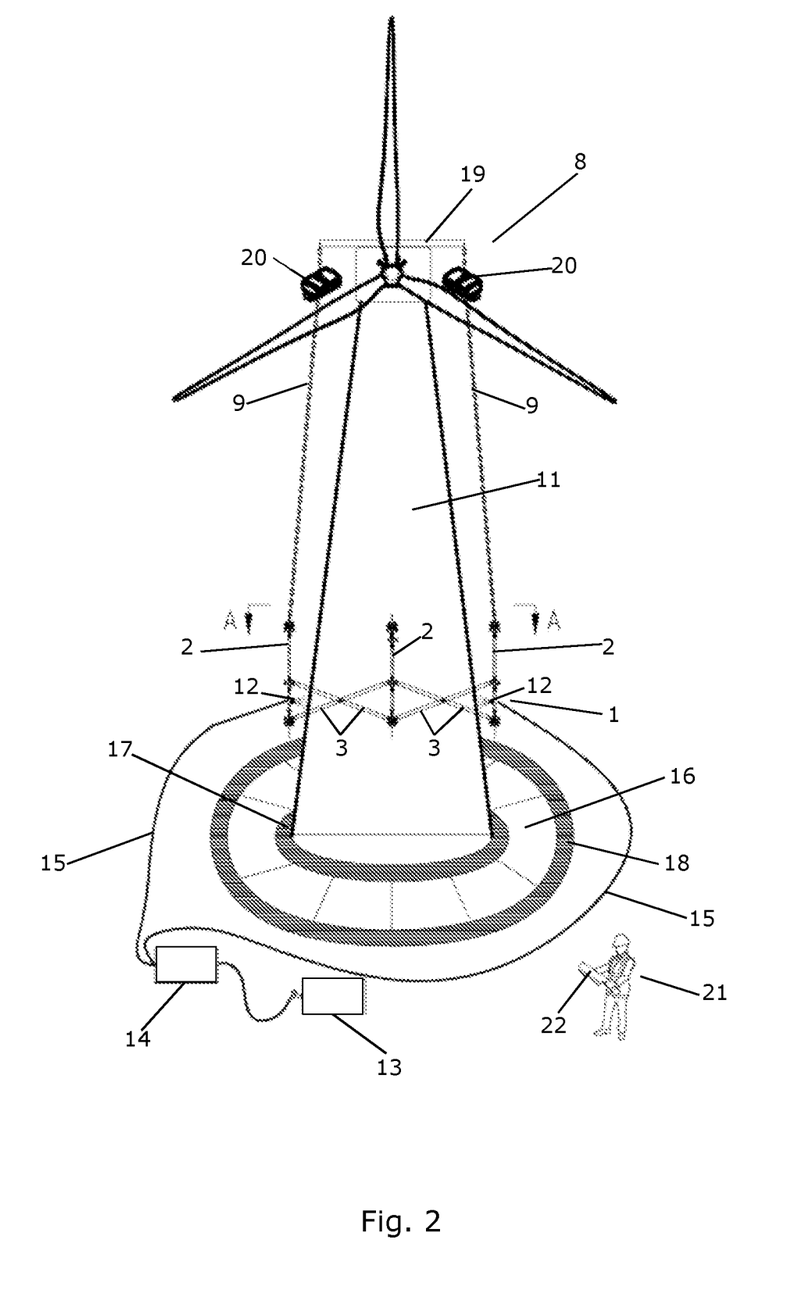
FIG. 2 is a side view of a wind turbine tower structure having an apparatus according to an embodiment of the invention mounted thereon in a first position along the tower structure.

FIG. 2 is a side view of a wind turbine tower structure 11 having an apparatus 1 according to an embodiment of the invention mounted thereon. The tower structure 11 has an outer diameter which decreases along an upwards direction. The apparatus 1 could, e.g., be the apparatus 1 illustrated in FIG. 1.

The apparatus 1 is mounted on the tower structure 11 at a first position, which is relatively close to the ground. Accordingly, the apparatus 1 is mounted on the tower structure 11 at a position where the outer diameter of the tower structure 11 is relatively large. Therefore the scissor structure formed by the frame elements 3 and the sliding rails 2 of the apparatus 1 is in an expanded position, allowing the diameter of the frame structure to adapt to the large outer diameter of the tower structure 11. It can be seen from FIG. 2 that this is obtained by allowing the slidingly connected ends of the frame elements 3 to slide to a relatively low position along the sliding rails 2.

The apparatus 1 is provided with a plurality of nozzles 12, two of which are shown. The nozzles 12 are connected to a fluid reservoir 13, via a pump 14 and hoses 15. Thereby the nozzles 12 are configured to spray the fluid onto an outer surface of the tower structure 11. The fluid could, e.g., be water or a cleaning agent. In this case the apparatus 1 may be used for cleaning the outer surface of the tower structure 11. As an alternative, the nozzles 12 may be configured to spray another kind of fluid onto the outer surface of the tower structure 11, such as paint, coating or the like.

A fluid collecting system 16 is mounted circumferentially around the base of the tower structure 11. The fluid collecting system 16 comprises a seal 17, which is configured to conform to the surface of the tower structure 11. Thereby a tight fit is provided between the outer surface of the tower structure 11 and the fluid collecting system 16. The fluid collecting system 16 further comprises an outer inflatable barrier 18. When the outer inflatable barrier 18 is inflated, leakage from the fluid collecting system 16 is prevented. Thus, surplus fluid sprayed onto the outer surface of the tower structure 11 by means of the nozzles 12 flows along the outer surface of the tower structure 11, and is collected in the fluid collecting system 16.

The hoisting mechanism 8 comprises a beam 19 arranged on top of the wind turbine, and a number of lifting apparatuses 20, two of which are shown. The lifting apparatuses 20 could, e.g., be in the form of cranes or winches. The lifting apparatuses 20 are connected to the apparatus 1 via wires 9.

An operator 21 can operate the lifting apparatuses 20, and possibly also at least the nozzles 12 of the apparatus 1, by means of a remote control 22. Accordingly, the apparatus 1 can be moved along the tower structure 11 without requiring that the operator 21 is positioned on the apparatus 1 or at the position of the lifting apparatuses 20.

Figure 3:
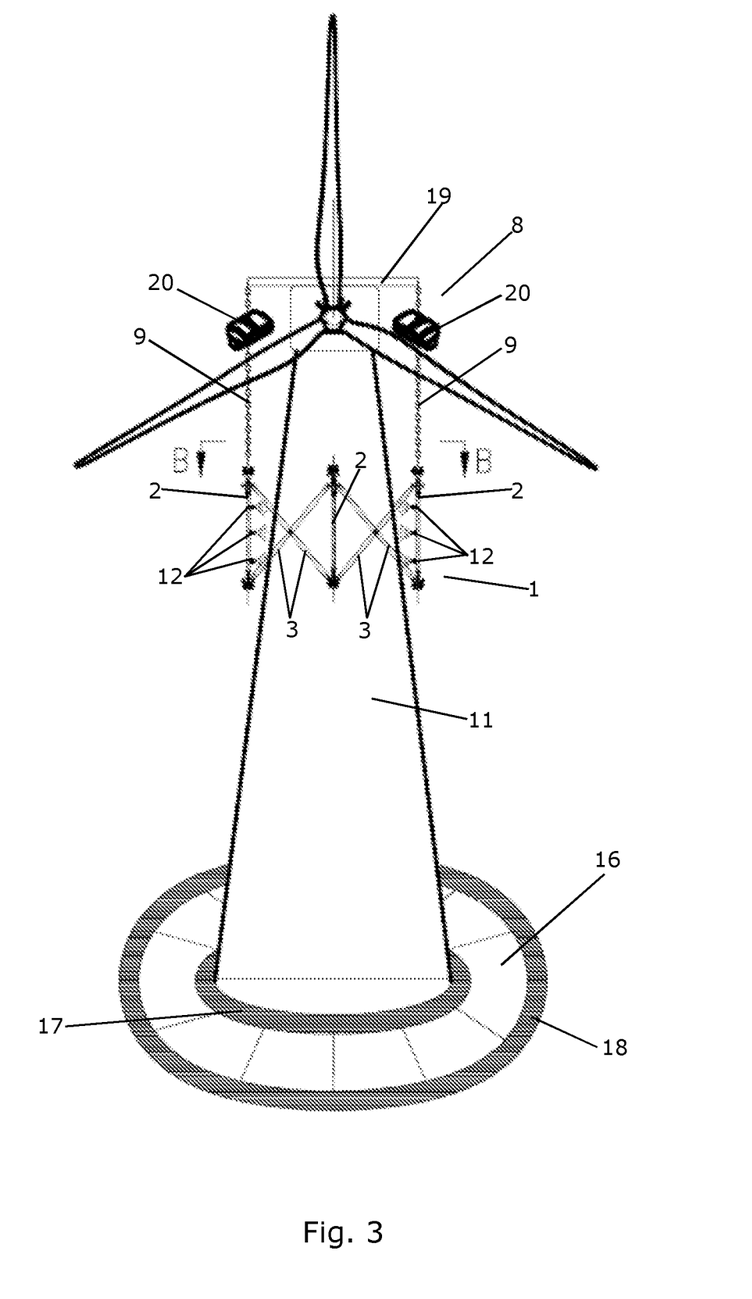
FIG. 3 is a side view of the a wind turbine tower structure having an apparatus according to an embodiment of the invention mounted thereon in a second position along the tower structure.

FIG. 3 is a side view of the wind turbine tower structure 11 and apparatus 1 of FIG. 2. However, in FIG. 3 the apparatus 1 is mounted on the tower structure 11 at a second position, which is further away from the ground and closer to the top of the tower structure 11 than the first position illustrated in FIG. 2. Accordingly, the apparatus 1 is mounted on the tower structure 11 at a position where the outer diameter of the tower structure 11 is smaller than is the case in the situation illustrated in FIG. 2. Therefore the scissor structure formed by the frame elements 3 and the sliding rails 2 of the apparatus 1 is contracted as compared to the situation illustrated in FIG. 2, allowing the diameter of the frame structure to adapt to the smaller outer diameter of the tower structure 11. It can be seen from FIG. 3 that this is obtained by allowing the slidingly connected ends of the frame elements 3 to slide to a relatively high position along the sliding rails 2.

Figure 4:
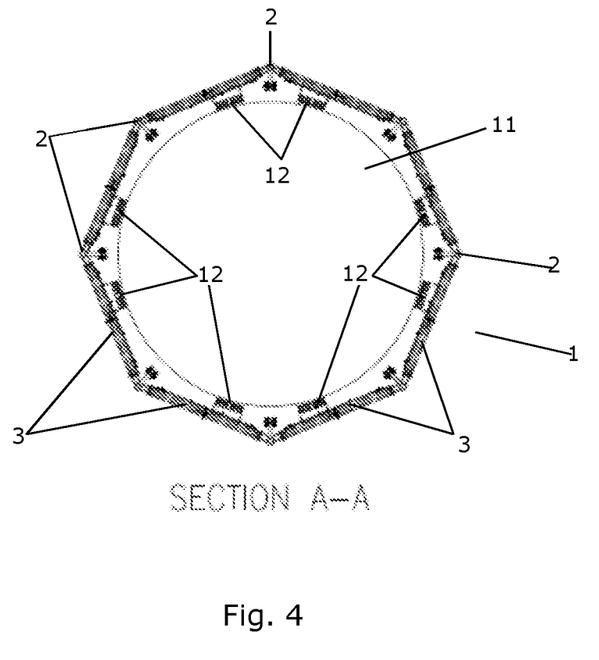
FIG. 4 is a cross sectional view of the wind turbine tower structure and apparatus of FIG. 2, along the line A-A.
Figure 5:
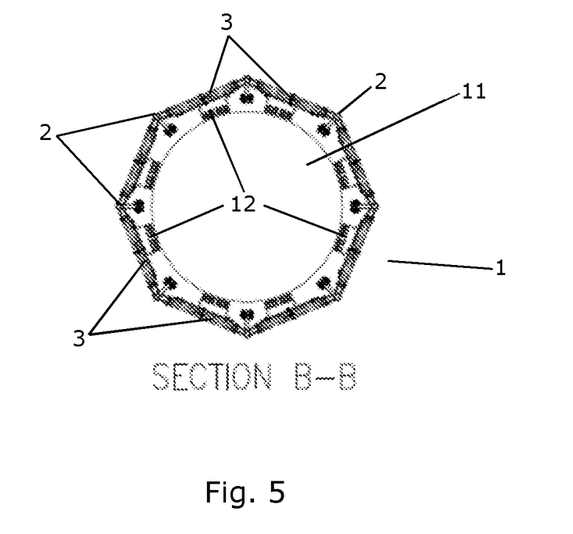
FIG. 5 is a cross sectional view of the wind turbine tower structure and apparatus of FIG. 3, along the line B-B.

FIG. 4 is a cross sectional view of the wind turbine tower structure 11 and apparatus 1 of FIG. 2, along the line A-A, and FIG. 5 is a cross sectional view of the wind turbine tower structure 11 and apparatus 1 of FIG. 3, along the line B-B. It is clear from FIGS. 4 and 5 that the scissor structure defined by the frame elements 3 and sliding rails 2 of the apparatus 1 of FIGS. 3 and 5 is contracted as compared to the situation illustrated in FIGS. 2 and 4.

Figure 6:
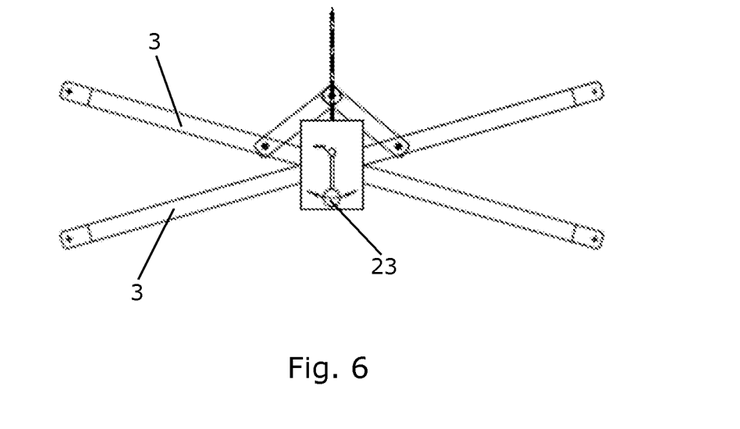
FIG. 6 is a side view of a first detail of an apparatus according to an embodiment of the invention.

FIG. 6 is a side view of a first detail of an apparatus 1 according to an embodiment of the invention. Two frame elements 3 of the frame structure are connected pivotally to each other in a pivot point. At the pivot point, a pendulum 23 is mounted. In the case that the frame structure is tilted during hoisting or lowering of the apparatus 1, the pendulum 23 will swing away from its neutral position. The pendulum 23 may be connected to a control unit for controlling operation of the lifting apparatuses of the hoisting mechanism in such a manner that the operation of the lifting apparatuses is adjusted when the pendulum 23 swings away from its neutral position. Thereby a substantially horizontal orientation of the frame structure is restored.

Figure 7:
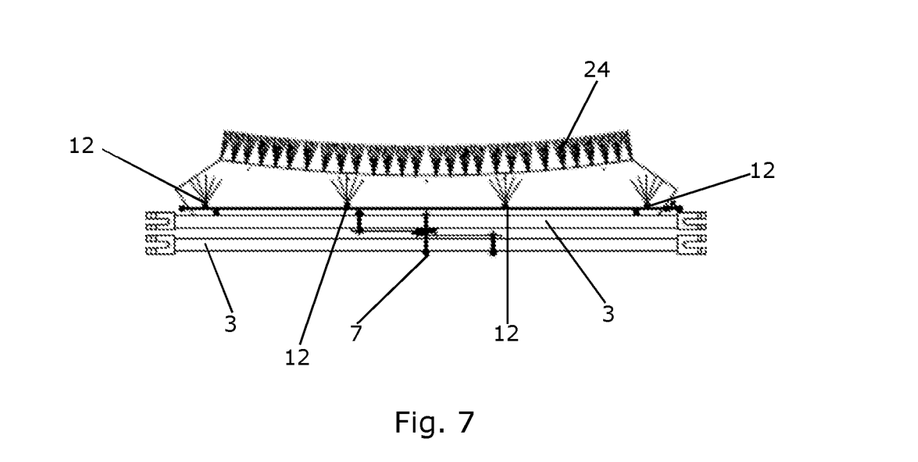
FIG. 7 is a side view of a second detail of an apparatus according to an embodiment of the invention.

FIG. 7 is a side view of a second detail of an apparatus 1 according to an embodiment of the invention. Two frame elements 3 of the frame structure are connected pivotally to each other in a pivot point 7. Four nozzles 12 are mounted on one of the frame elements 3. Spray confinement means in the form of spray protection brushes 24 are mounted adjacent to the nozzles 12. Thereby the fluid being sprayed by means of the nozzles 12 is contained within a boundary defined by the spray confinement means 24. Accordingly, it is ensured that the fluid being sprayed by means of the nozzles 12 is directed towards a desired portion of the outer surface of the tower structure having the apparatus 1 mounted thereon.

Figure 8A:
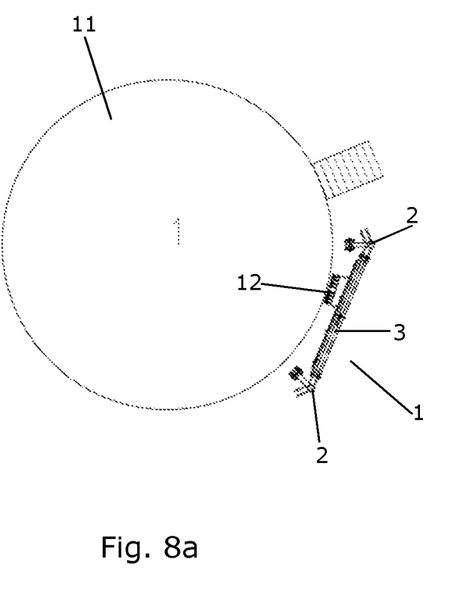
FIGS. 8*a*-8*h* illustrate sequential assembly of an apparatus according to an embodiment of the invention around a tower structure.

FIGS. 8a-8h illustrate sequential assembly of an apparatus 1 according to an embodiment of the invention around a tower structure 11. In FIG. 8a only one subassembly of the apparatus 1 has been arranged adjacent to the tower structure 11. The subassembly includes a number of frame elements 3 having a nozzle 12 mounted thereon, the frame elements 3 being connected to two sliding rails 2.

Figure 8B:
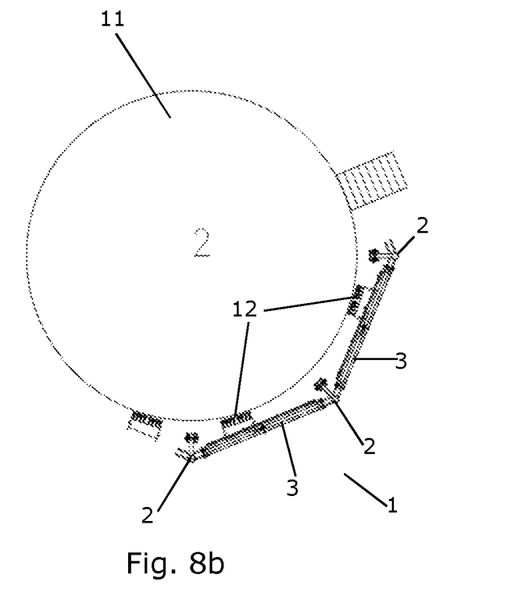
Figure 8C:
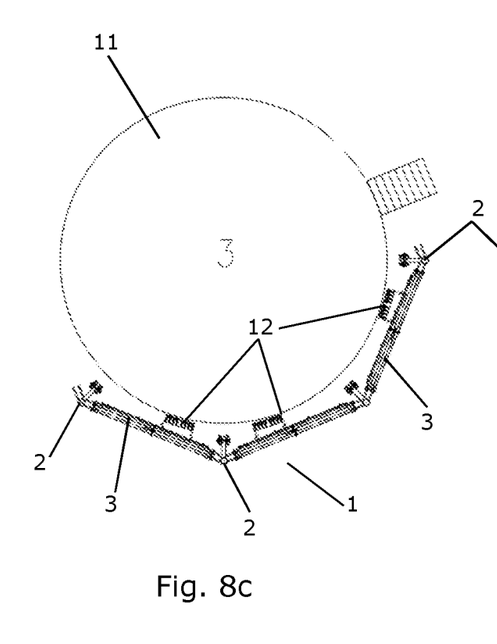
Figure 8D:
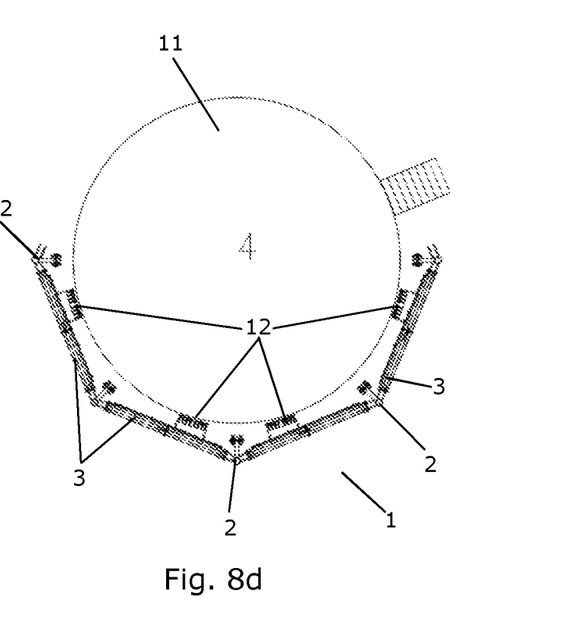
Figure 8E:
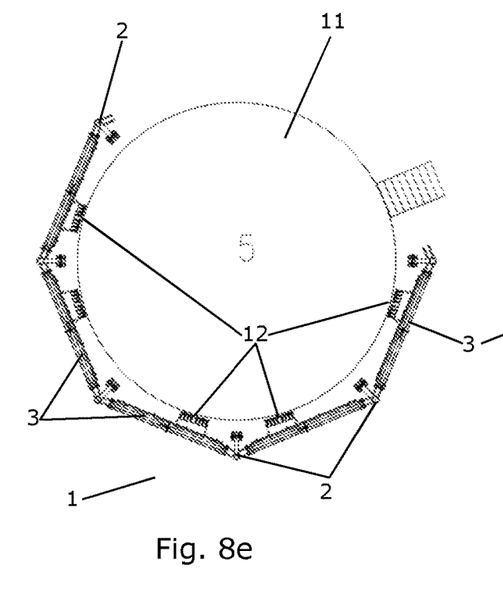
Figure 8F:
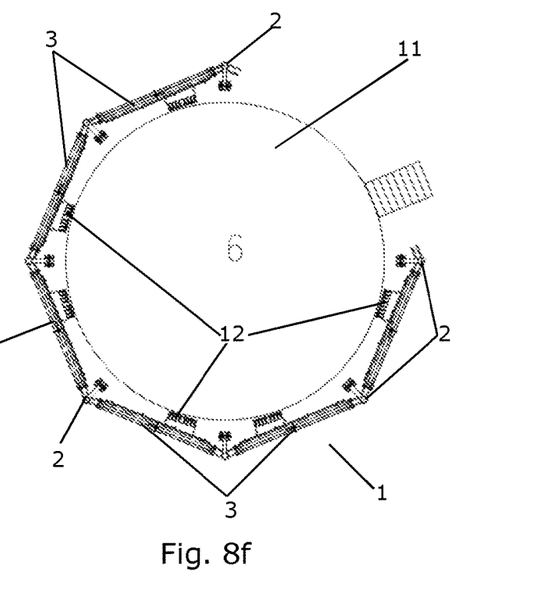
Figure 8G:
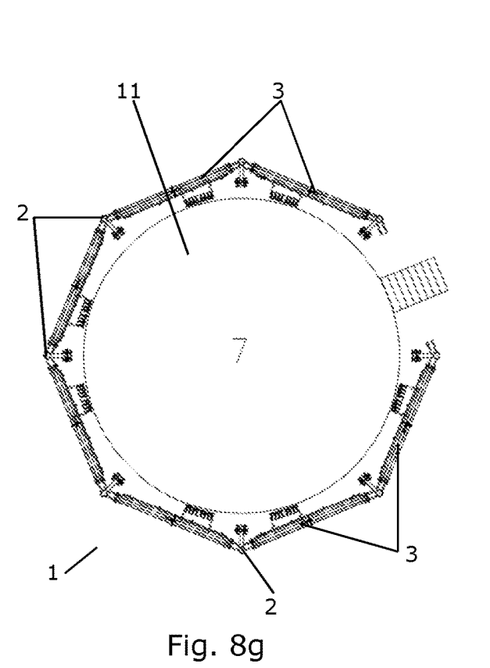

In FIG. 8b a second subassembly has been assembled to the first section, in the form of an additional number of frame elements 3, having a nozzle 12 mounted thereon, and an additional sliding rail 2.

Figure 8H:
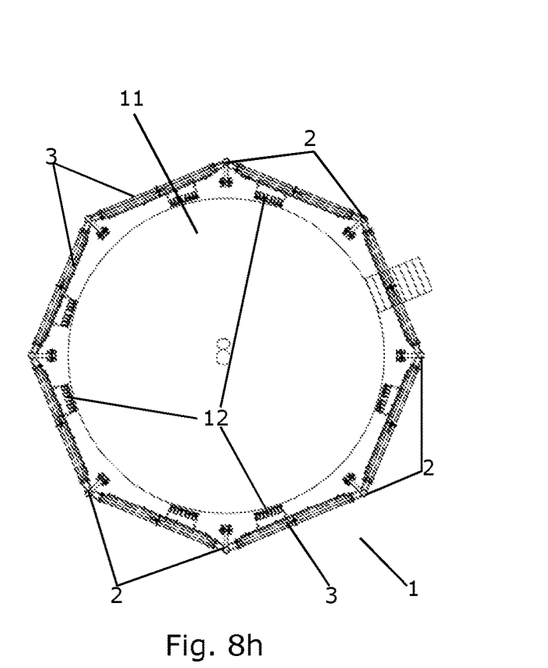

In FIGS. 8c-8h, additional subassemblies are sequentially added to the apparatus 1, until eight subassemblies cover the entire periphery of the tower structure 11, as illustrated in FIG. 8h. It can be seen from FIG. 8h that the frame structure of the final apparatus 1 defines an octagonal shape. This shape represents a suitable balance between a structure which follows the circular circumference of the tower structure 11 and straight sections which are easy to handle.

It is an advantage of the embodiment illustrated in FIGS. 8a-8h that it is modular in the sense that it is manufactured from a number of subassemblies which can be transported and handled separately. This makes it easier to transport the apparatus 1 and to mount the apparatus 1 on a tower structure 11.

The invention claimed is:

1. A system for movement along a tower structure, comprising:
   an apparatus configured to be arranged at least partly circumferentially around the tower structure, the apparatus comprising:
      a plurality of sliding rails, and
      a frame structure comprising a plurality of frame elements, each frame element being slidably connected to at least one of the sliding rails, the frame elements and the sliding rails being interconnected to form a scissor structure, and
   a hoisting mechanism for raising and lowering one or more wires connected to the frame structure of the apparatus via connection points of at least some of the frame elements at or near positions where the frame elements are connected to the sliding rails, wherein the plurality of frame elements pivot with respect to each other at said connection points along a horizontal pivot axis, the hoisting mechanism for hoisting the apparatus along the tower structure having the apparatus mounted thereon,
   wherein raising and lowering the one or more wires using the hoisting mechanism, in combination with gravity working on the frame structure, causes the frame elements to slide along the sliding rails, thereby causing the scissor structure to contract and expand, respectively, to adjust a diameter of the frame structure to an outer diameter of the tower structure having the apparatus mounted thereon.

2. The system according to claim 1, wherein the frame elements are arranged in pairs, where a first frame element of a pair of frame elements has a first end fixedly connected to a first sliding rail and a second end connected slidingly to a second sliding rail, and where a second frame element of the pair of frame elements has a third end fixedly connected to the second sliding rail and a fourth end connected slidingly to the first sliding rail, and wherein the first frame element and the second frame element are pivotally connected to each other at a position arranged between the first end and second end of the first frame element and the third end and fourth end of the second frame element.

3. The system according to claim 1, wherein the frame structure defines a polygonal shape configured to surround the circumference of the tower structure.

4. The system according to claim 1, wherein the apparatus comprises treatment means for applying a surface treatment to a surface of the tower structure, and wherein the treatment means is configured for cleaning, abrasive treatment, painting and/or coating of the surface of the tower structure.

5. The system according to claim 4, wherein the treatment means comprises a plurality of nozzles arranged to spray a fluid onto the tower structure having the apparatus mounted thereon, and at least one fluid reservoir connected to the plurality of nozzles.

6. The system according to claim 5, wherein the treatment means comprises a plurality of spray confinement means arranged in pairs on opposing sides of at least some of the plurality of nozzles in order to substantially contain the fluid being sprayed from the at least some of the plurality of nozzles within a boundary defined by the spray confinement means.

7. The system according to claim 5, wherein the apparatus comprises or is connected to a fluid collecting system for collecting surplus fluid sprayed by means of the plurality of nozzles.

8. The system according to claim 1, wherein the frame structure comprises two or more subassemblies being releasably connected to each other, thereby allowing the frame structure to be assembled and disassembled.

9. The system according to claim 1, wherein the hoisting mechanism comprises a beam configured to be arranged on top of the tower structure, and a lifting apparatus operatively connected to the one or more wires.

10. The system according to claim 1, wherein the hoisting mechanism comprises a control mechanism arranged to ensure that the apparatus maintains a substantially horizontal orientation during movement along the tower structure.

11. The system according to claim 1, further comprising a remote control, wherein the remote control is configured for wired or wireless control of at least the hoisting mechanism from a position remote to the hoisting mechanism.

12. The system according to claim 1, wherein the apparatus comprises a plurality of nozzles arranged to spray a fluid onto the tower structure having the apparatus mounted thereon, and wherein the system further comprises a fluid reservoir connected to the plurality of nozzles and a fluid collecting system for collecting surplus fluid sprayed by means of the plurality of nozzles.

13. The system according to claim 12, wherein the fluid collecting system is configured to be arranged circumferentially around the tower structure.

14. The system according to claim 13, wherein the fluid collection system comprises a seal, wherein the seal is configured to conform to a surface of the tower structure.

* * * * *